United States Patent
Da Silva et al.

(10) Patent No.: US 11,218,360 B2
(45) Date of Patent: *Jan. 4, 2022

(54) AUTOMATION SYSTEM WITH EDGE COMPUTING

(71) Applicant: Quest Automated Services, LLC, Tulsa, OK (US)

(72) Inventors: Hanz Da Silva, Fort Worth, TX (US); Edward Martell, Arlington, TX (US)

(73) Assignee: QUEST AUTOMATED SERVICES, LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/707,918

(22) Filed: Dec. 9, 2019

(65) Prior Publication Data

US 2021/0173384 A1 Jun. 10, 2021

(51) Int. Cl.
| | | |
|---|---|---|
| *H04L 12/24* | (2006.01) | |
| *G05B 19/418* | (2006.01) | |
| *G05B 19/05* | (2006.01) | |
| *G05B 19/042* | (2006.01) | |
| *H04L 29/12* | (2006.01) | |
| *H04L 29/06* | (2006.01) | |

(52) U.S. Cl.
CPC .......... *H04L 41/08* (2013.01); *G05B 19/042* (2013.01); *G05B 19/05* (2013.01); *G05B 19/4183* (2013.01); *G05B 19/4185* (2013.01); *H04L 61/20* (2013.01); *H04L 61/2038* (2013.01); *H04L 61/2046* (2013.01); *H04L 61/6004* (2013.01); *H04L 61/6022* (2013.01); *H04L 65/1013* (2013.01)

(58) Field of Classification Search
CPC G05B 19/4185; G05B 19/4183; G05B 19/05; G05B 19/042; H04L 61/2046; H04L 61/20; H04L 61/2038; H04L 61/6004; H04L 61/6022; H04L 41/08
See application file for complete search history.

(56) References Cited

U.S. PATENT DOCUMENTS

| | | |
|---|---|---|
| 4,772,876 A | 9/1988 | Laud |
| 5,886,894 A | 3/1999 | Rakoff |
| 6,363,469 B1 | 3/2002 | Okamoto |
| 6,751,729 B1 | 6/2004 | Giniger et al. |
| 6,957,115 B1 | 10/2005 | Meyer-Grafe et al. |
| 6,965,816 B2 | 11/2005 | Walker |
| 7,019,639 B2 | 3/2006 | Stilp |

(Continued)

OTHER PUBLICATIONS

LittleBits, "How the Cloudbit Works", https://auth.littlebits.com/cloudstart, Internet Archive date: Sep. 2, 2019 (Year: 2019).*

(Continued)

*Primary Examiner* — Ramy M Osman
(74) *Attorney, Agent, or Firm* — Hall Estill Law Firm

(57) ABSTRACT

An automation system employing multiple automated devices can establish and utilize two-way communication independent of a network controller by generating a unique network address with respective local circuitry. The local circuitry can be incorporated into a device or physically installed on-site in the form of an attachment, which allows automated devices to be upgraded and supplemented without altering the programming of a network controller.

20 Claims, 4 Drawing Sheets

(56) References Cited

U.S. PATENT DOCUMENTS

| | | | |
|---|---|---|---|
| 7,266,818 B2* | 9/2007 | Pike | G06F 9/4406 |
| | | | 709/222 |
| 7,386,605 B2 | 6/2008 | Shah | |
| 7,397,911 B2 | 7/2008 | Shen et al. | |
| 7,865,252 B2 | 1/2011 | Clayton | |
| 8,098,665 B2 | 1/2012 | Hu | |
| 8,515,563 B2 | 8/2013 | Weddingfeld et al. | |
| 8,745,281 B2 | 6/2014 | Petzen | |
| 8,937,950 B2 | 1/2015 | Dunbar et al. | |
| 9,483,035 B2* | 11/2016 | Buchdunger | G05B 19/4185 |
| 10,063,666 B2 | 8/2018 | Wei et al. | |
| 10,091,231 B1 | 10/2018 | Gates | |
| 10,142,353 B2 | 11/2018 | Yadav | |
| 10,326,732 B1* | 6/2019 | Martell | H04L 61/2038 |
| 10,523,673 B1* | 12/2019 | Cooper | H04L 63/20 |
| 10,534,351 B1* | 1/2020 | Martell | G05B 19/4185 |
| 10,574,475 B2* | 2/2020 | Drake | H04L 63/0442 |
| 2002/0032846 A1* | 3/2002 | Doyle | G06F 9/3879 |
| | | | 711/202 |
| 2002/0095501 A1* | 7/2002 | Chiloyan | H04L 67/16 |
| | | | 709/227 |
| 2002/0131446 A1 | 9/2002 | Metcalf, III | |
| 2002/0143411 A1* | 10/2002 | Varone | H04L 61/6022 |
| | | | 700/17 |
| 2003/0051014 A1* | 3/2003 | Gluska | H04L 61/20 |
| | | | 709/222 |
| 2003/0177268 A1* | 9/2003 | Youn | H04L 61/20 |
| | | | 709/245 |
| 2004/0030823 A1 | 2/2004 | Honda et al. | |
| 2004/0107345 A1 | 6/2004 | Brandt et al. | |
| 2004/0111501 A1* | 6/2004 | Lee | H04L 61/2038 |
| | | | 709/222 |
| 2004/0117624 A1 | 6/2004 | Brandt et al. | |
| 2004/0133721 A1* | 7/2004 | Ellerbrock | H04L 61/2038 |
| | | | 710/104 |
| 2004/0153171 A1 | 8/2004 | Brandt et al. | |
| 2004/0190518 A1 | 9/2004 | Miyajima | |
| 2004/0246332 A1 | 12/2004 | Crouch | |
| 2005/0160136 A1 | 7/2005 | Takahashi | |
| 2005/0160183 A1 | 7/2005 | Valli et al. | |
| 2005/0185595 A1* | 8/2005 | Lee | H04L 61/2046 |
| | | | 370/252 |
| 2005/0220144 A1 | 10/2005 | Ishiyama et al. | |
| 2006/0005014 A1 | 1/2006 | Aura et al. | |
| 2006/0020796 A1 | 1/2006 | Aura et al. | |
| 2006/0026672 A1 | 2/2006 | Braun | |
| 2006/0031488 A1* | 2/2006 | Swales | H04L 61/2023 |
| | | | 709/224 |
| 2006/0217768 A1 | 9/2006 | Buhlmann et al. | |
| 2006/0218409 A1 | 9/2006 | Avraham et al. | |
| 2007/0121596 A1 | 5/2007 | Kurapati et al. | |
| 2007/0156670 A1 | 7/2007 | Lim | |
| 2008/0107131 A1* | 5/2008 | Ma | H04L 61/2015 |
| | | | 370/468 |
| 2008/0156121 A1* | 7/2008 | Radomsky | F16K 37/0083 |
| | | | 73/865.8 |
| 2008/0204136 A1 | 8/2008 | Nagatani et al. | |
| 2009/0116321 A1 | 5/2009 | Shirur et al. | |
| 2010/0002879 A1 | 1/2010 | Risley | |
| 2010/0138593 A1 | 6/2010 | Ootsuka | |
| 2010/0180016 A1* | 7/2010 | Bugwadia | H04L 41/0806 |
| | | | 709/220 |
| 2010/0183150 A1 | 7/2010 | Lee et al. | |
| 2010/0268804 A1 | 10/2010 | Aso et al. | |
| 2011/0004771 A1 | 1/2011 | Matsushima et al. | |
| 2011/0016891 A1* | 1/2011 | McDonald | H04L 12/403 |
| | | | 62/55.5 |
| 2011/0077028 A1 | 3/2011 | Wilkes, III et al. | |
| 2012/0005326 A1 | 1/2012 | Bradetich et al. | |
| 2012/0070019 A1* | 3/2012 | Corlett | H04L 41/0809 |
| | | | 381/122 |
| 2012/0233656 A1 | 9/2012 | Rieschick et al. | |
| 2012/0276517 A1 | 11/2012 | Banaszuk et al. | |
| 2012/0290775 A1 | 11/2012 | Ichioka | |
| 2013/0051238 A1 | 2/2013 | Maria | |
| 2013/0081103 A1 | 3/2013 | Uner et al. | |
| 2013/0215825 A1* | 8/2013 | Hsu | H04L 69/167 |
| | | | 370/328 |
| 2013/0309154 A1 | 11/2013 | Call et al. | |
| 2014/0142777 A1* | 5/2014 | Dawidczak | H04L 67/125 |
| | | | 700/295 |
| 2014/0173059 A1* | 6/2014 | Koningstein | H04L 41/084 |
| | | | 709/220 |
| 2014/0215179 A1 | 7/2014 | Matsuhira | |
| 2014/0310509 A1 | 10/2014 | Potlapally et al. | |
| 2014/0310510 A1 | 10/2014 | Potlapally et al. | |
| 2014/0325685 A1* | 10/2014 | Ha | G06F 21/6218 |
| | | | 726/30 |
| 2015/0067196 A1 | 3/2015 | Little | |
| 2015/0113363 A1 | 4/2015 | Lee et al. | |
| 2015/0130614 A1 | 5/2015 | Liu | |
| 2015/0161398 A1 | 6/2015 | De Cristofaro et al. | |
| 2015/0286824 A1 | 10/2015 | Freudiger et al. | |
| 2015/0286825 A1 | 10/2015 | Freudiger et al. | |
| 2016/0112445 A1 | 4/2016 | Abramowitz | |
| 2016/0135706 A1 | 5/2016 | Sullivan et al. | |
| 2016/0209899 A1* | 7/2016 | Brantner et al. | H04L 67/125 |
| 2016/0226913 A1 | 8/2016 | Sood et al. | |
| 2016/0241511 A1* | 8/2016 | Albrecht | G05B 19/4185 |
| 2016/0248800 A1 | 8/2016 | Ng et al. | |
| 2016/0259944 A1 | 9/2016 | Okihara | |
| 2016/0373474 A1 | 12/2016 | Sood et al. | |
| 2017/0063920 A1 | 3/2017 | Thomas et al. | |
| 2017/0126727 A1 | 5/2017 | Beam et al. | |
| 2017/0138941 A1* | 5/2017 | Cao | G01N 33/587 |
| 2017/0155676 A1 | 6/2017 | Tamir et al. | |
| 2017/0171231 A1 | 6/2017 | Reybok, Jr. et al. | |
| 2017/0202046 A1 | 7/2017 | Lee et al. | |
| 2017/0329966 A1 | 11/2017 | Koganti et al. | |
| 2018/0041529 A1 | 2/2018 | Mixer et al. | |
| 2018/0115522 A1 | 4/2018 | Gleichauf | |
| 2018/0145844 A1* | 5/2018 | Pera | H04L 12/2816 |
| 2018/0288063 A1 | 10/2018 | Koottayi et al. | |
| 2018/0343281 A1 | 11/2018 | Ahuja et al. | |
| 2018/0351906 A1* | 12/2018 | Cook | H04L 61/2038 |

OTHER PUBLICATIONS

Stroub, Mark, "Howto Make 'Dumb Devices' Smart", Oct. 21, 2019, AM Conservation Group, https://info.amconservationgroup.com/blog/make-dumb-devices-smart (Year: 2019).*

Bradford, Alina, "How to set up a smart plug", Dec. 22, 2018, https://www.cnet.com/how-to/new-smart-plug-tips/ (Year: 2018).*

Barret, Brian, "How to Build a Smart Home With Your Own Dumb Stuff", Mar. 9, 2015, https://www.wired.com/2015/03/build-smart-home-dumb-stuff/ (Year: 2015).*

* cited by examiner

AUTOMATION SYSTEM WITH EDGE COMPUTING

SUMMARY

Various embodiments provide edge computing in an automation system with an automated device connected to a local computing circuitry and a network computing device on a single site. The local computing circuitry is configured to generate a unique automation network address from unique factory information collected from the automated device independent of the network computing device.

An automation system, in other embodiments, can operate by connecting local computing circuitry to an automated device and a network computing device with each of the local computing circuitry, automated device, and network computing device positioned on a single site. At least one piece of unique factory information from the first automated device is collected with the local computing circuitry in order to generate a unique automation system network address with the local computing circuitry independent of the network computing device. The unique automation system network address is employed to conduct at least one automation task with the automated device.

DETAILED DESCRIPTION

Assorted embodiments of the present disclosure are generally directed to an automation system employing multiple automated devices with local circuitry that generates unique addresses to allow direct device-to-device two-way communication, which optimizes the efficiency and modularity of the automation system.

As computing hardware and software have become more sophisticated, automation systems have evolved into complex mixtures of software languages and communication protocols. Such complexity often corresponds with time-consuming and precise system administration, particularly upon device installation, upgrade, or reassignment. The trend of utilizing greater numbers and types of automated devices in a system increases the likelihood of device replacement, service, and/or reassignment, which requires further system administration at the cost of man power and system down-time. Hence, there is an opportunity to optimize automation systems employing multiple automated devices.

Accordingly, various embodiments are directed to providing computing circuitry to an automation system to allow for at least the generation and utilization of two-way unique device addresses at the device level instead of a network server/controller/node level. The ability to deploy hardware and software locally at the device level allows for device-to-device communication, data transmission, and operational optimizations without requiring network controller computation, implementation, or transfer of system signals. The implementation of hardware circuitry as an attachment to an automation device allows for simple, efficient, and straightforward deployment of system upgrades without having extensive system downtime, reprogramming, or added complexity.

Figure 1:
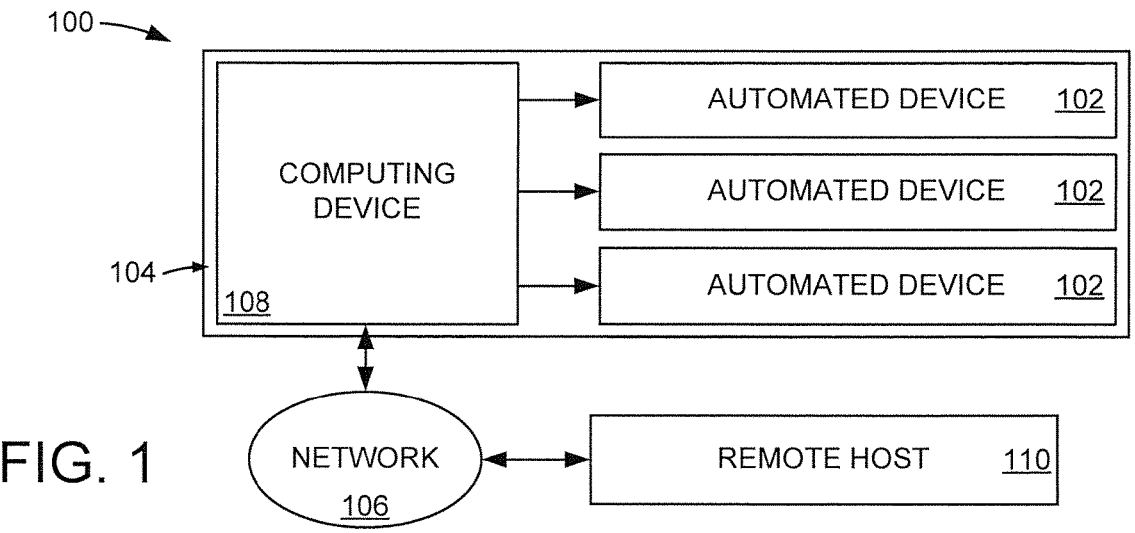
FIG. 1 is a block representation of an example automation system in which assorted embodiments can be practiced.

FIG. 1 depicts a block representation of portions of an example automation system 100 in which assorted embodiments may be practiced. The system 100 can consist of any number of separate automated devices 102 positioned within a single site 104, or distributed across a number of separate sites and interconnected via one or more wired, or wireless, networks 106. An automated device 102 can be any type, size, function, and construction that can perform autonomously. For instance, a first automated device 102 may be a sensor while a second automated device 102 is a robotic assembly and a third automated device is a solenoid.

It is contemplated that the respective automated devices 102 can operate independently and/or concurrently, as programmed, to carry out one or more tasks, such as the assembly of a machine, transformation of a material, collection of hydrocarbons, or processing of a substance. While programmed operation can be carried out cyclically by the respective automated devices 102, data analysis, system optimization, and inter-device communications can be executed exclusively by downstream computing devices 108, such as a controller, microprocessor, or other programmable circuitry.

The use of one or more centralized computing devices 108 to carry direct operation of the automation system 100 and the respective devices 102 allows the devices 102 to be cheaper and simpler than incorporating computing hardware into every device 102. As such, various embodiments arrange the respective automated devices as "dummy" devices that can execute programmed instructions, but cannot transform signals, software, or data in a manner that allows inter-device communication, data analysis, device repurposing, or device instruction alterations, which is reserved for downstream computing devices 108.

As a result of utilizing dummy devices 102, the complexity of a system 100 can be somewhat mitigated by consolidating computing activity in a central device 108 and/or a remote host 110. However, such consolidation of computing activity can limit the efficiency and accuracy of the system 100, particularly when fast device 102 operations are needed or when the number of devices 102 on a single site 104, or connected remotely via the network 106, cause channel and/or processing latency in the central device 108. Thus, there is a continued need for a balance of computing activity in an automation system 100 that allows for optimized performance and reduced reliance on centralized computing devices 108 without degrading system operation via increased complexity.

Figure 2:
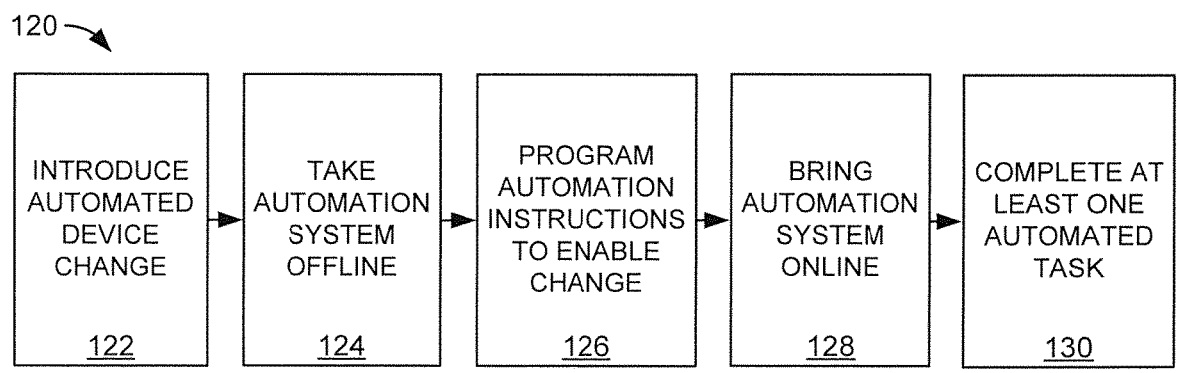
FIG. 2 depicts an example timeline of actions that can be carried out by the automation system of FIG. 1.

FIG. 2 depicts an example timeline 120 of events associated with utilizing automated devices 102 in the automation system 100 of FIG. 1 in accordance with some embodiments. The timeline 120 is contemplated with an established automation system that has at least one operational automated device capable of performing one or more tasks, such as material movement, assembly, processing, or packaging, without user involvement, such as manual manipulation, activation, or data input to the automated device. However, the events of the timeline may also be applicable for newly established automation systems where no automated devices have yet become operational.

With event 122, an automated device change is introduced to the automation system. Such a change is not limited, but may be the introduction of a new device, repurposing of an existing device, or alteration to the programmed automated activity of an existing device. For instance, a new automation device can be physically installed into a position on a site and connected to a local computing device 108 via one or more network connections. Due to the automated device not having local computing capabilities and instead having circuitry capable of storing programmed code, executing automation instructions, and returning data to a downstream network computing device, a user brings the automation system offline in event 124 while programming automation instructions for the device in event 126.

The programming of automation instructions by a user in event 126 may involve one or more software actions that enable the device to activate, function, return data, and deactivate as desired by the user to complete at least one task. As a non-limiting example, device software actions in event 126 can generate and store static programming code in the device's native execution language. Another example of a software action can be translating the device's native output into a communication protocol, such as Open Platform Communications Unified Architecture (OPC-UA), and/or setting operational parameters in the native software stored in the device during manufacturing. Hence, the software action(s) of event 126 convert a non-operational device into an operational device that will at least activate to perform a task and, perhaps, return data to a downstream network device pertaining to operation of the device.

The programming of all newly added, or modified, automated devices in event 126 allows the automation system to be brought online in event 128 and subsequent device operation completes at least one task in event 130 in accordance with the programmed instructions. As a result, the programmed devices of the system can operate cyclically executing the instructions programmed during event 126. While the device programming may be useful over time to complete tasks, it is contemplated that system conditions change over time and cause the programming of at least one device to be sub-optimal. For example, device operation may degrade over time complete a designated task, but with more time to completion, less precision, more danger, or greater amount of waste. Accordingly, embodiments are directed to providing computing capabilities locally in an automated device to allow communication between devices without network device involvement, which allows device modification and optimization over time without bringing the entire automation system offline.

Figure 3:
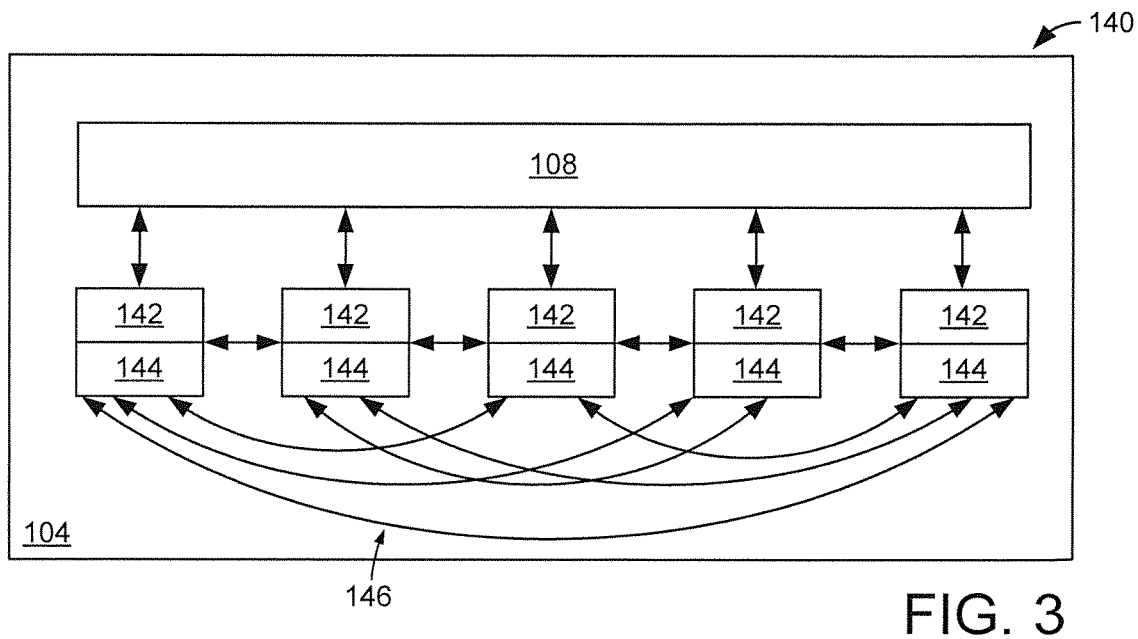
FIG. 3 depicts a block representation of portions of an example automation system configured in accordance with various embodiments.

The block representation in FIG. 3 depicts portions of an example automation system 140 configured in accordance with various embodiments to provide edge computing and optimal automated task operation over time. While not required or limiting, the automation system 140 can have multiple separate automation devices 142 that are each connected to a local computing device 108 positioned on-site 104. It is contemplated that the local computing device 108 can be connected to one or more off-site, remote hosts 110 that can provide data storage, processing, and maintenance to supplement the computing capabilities of the local device 108.

Although the local computing device 108 may have robust capabilities to facilitate communication between devices 142 and execute predetermined device programming to perform one or more autonomous and automated tasks, the performance of the device 108 may be stressed and/or degraded in response to managing large numbers of devices 142, different tasks being performed, and modifications to device 142 operation over time. Hence, each automated device 142 is equipped with a local computing circuitry 144 that enables device-to-device two-way communication, as illustrated by arrows 146, and modification of device 142 programming without involving the computing device 108.

The ability to generate unique device 142 addresses with the device-level computing circuitry 144 allows the devices 142 to transfer operational data and other information that can be used to alter existing thresholds, programming, and/or operation to adapt to changing environmental and device 142 conditions. For instance, the two-way communication between automated devices 142 can recognize a change to a task, such as greater waste, increased temperature, or slower delivery, which triggers the computing circuitry 144 to alter the programming of at least one automated device 142 to accommodate the task change and provide optimal automated activity individually and collectively amongst the devices 142.

The generation of a unique address with the device-level computing circuitry 144 further allows for two-way communication between the computing device 108 and each automated device 142. The local computing circuitry 144 may be hardware, such as a printed circuit board, employing programmable circuitry that can monitor device 142 operation and generate communication addresses and pathways between devices 142 independent of the computing device 108 or connected remote host 110. It is contemplated that the computing circuitry 144 physically attached to a single automated device 142 can evaluate other connected devices 142 of the system 140 in order to generate unique network addresses without involving the downstream computing device 108, which allows for two-way communications between automated devices 142 without signals and data flowing through the computing device 108.

Figure 4:
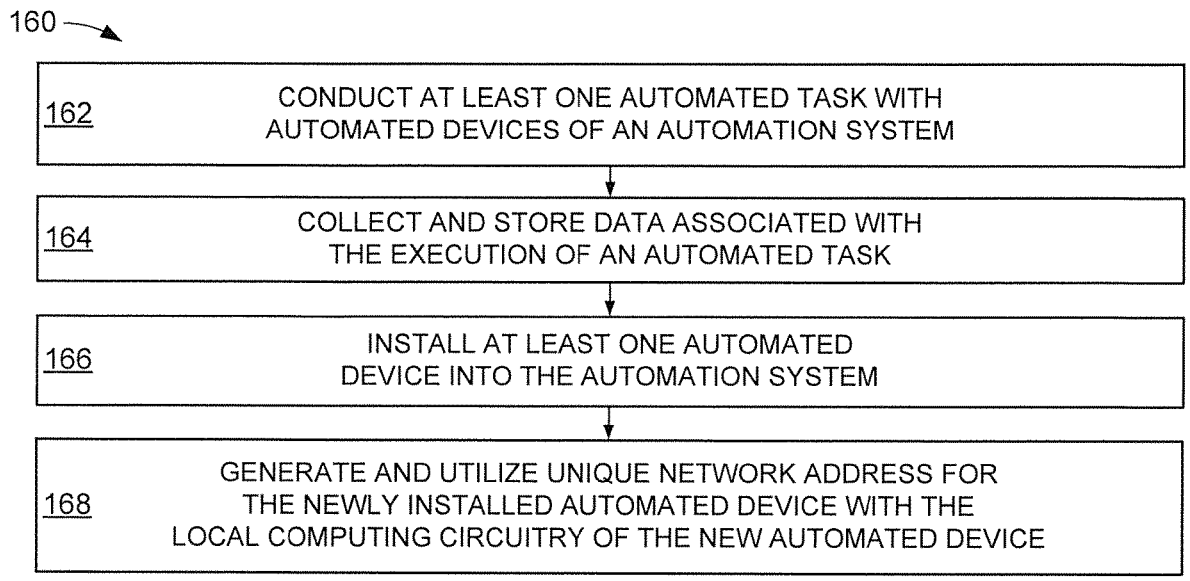
FIG. 4 depicts an example timeline of actions that can be carried out by the automation system of FIG. 3.

FIG. 4 depicts an example timeline 160 of the utilization of the example automation system 140 of FIG. 3. An automation system can be initially setup to allow event 162 to conduct at least one automated task, such as material movement, processing, evaluation, or transition. The automation system during event 162 is contemplated as having a plurality of automated devices that can be different types of devices that perform different automated actions. For instance, a first device may be a sensor that collects data while a second device is a solenoid that activates in response to a detected condition and a third device is a robotic assembly that articulates to physically alter the condition of a material.

Some embodiments of the automation system have one or more connected network computing devices that direct overall automation activity by communicating with the respective automated devices and any connected remote hosts. While not required or limiting, one or more automated devices of the automation system can have local computing circuitry that provides hardware and software capabilities that supplement the capabilities of the automated device. The local computing circuitry can be incorporated into the automated device from the device manufacturer, such as within the device's housing, or externally attached to the device, such as in-line external to the device's housing.

The presence of the local computing circuitry with at least one automated device allows event 164 to collect and store data associated with the automated task(s) of event 162. As a non-limiting example, local computing circuitry, such as a data source gateway historian, can evaluate and/or process data collected by the automated device in order to determine device performance metrics, such as latency, accuracy, time-to-completion, and if the automated task has properly occurred. It is contemplated that the local computing circuitry can conduct assorted data collection and processing activities without direction or involvement of a connected network computing device. The independent automation capabilities provided by the local computing circuitry may extend to communicating signals, information, commands, and data between automated devices without involvement of any network computing devices, which may correspond with the network computing device becoming a passthrough and/or switching mechanism without processing the constituent data, generating metadata, or generating destination addresses for the signals, information, commands, and data.

At some time after event 164, at least one automated device is newly installed into the automation system in event 166, which triggers the local computing circuitry of that new device to generate and assign a unique network address for the device in event 168. It is contemplated that the connection of a new automated device into the system triggers the local computing device of a different device of the network to generate and assign an address to the new device. The ability to utilize the local computing circuitry of other automated devices allows for the seamless integration of an automated device without local computing circuitry.

Figure 5:
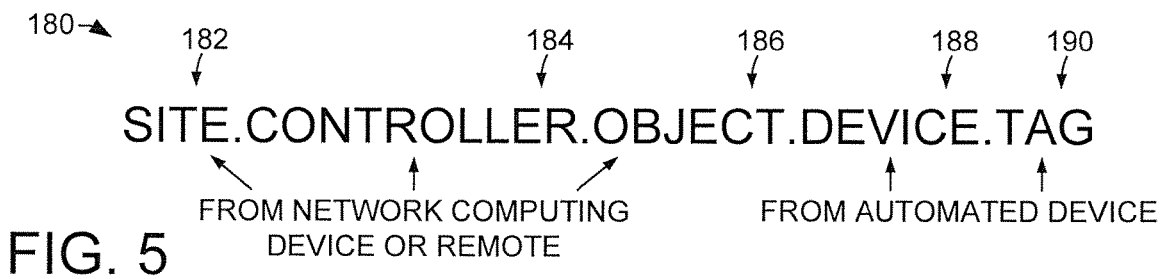
FIG. 5 depicts an example unique address within a given namespace that may be generated by local device computing circuitry in some embodiments.

FIG. 5 depicts an example unique network address 180 that may be generated by local device computing circuitry in accordance with some embodiments. The unique network address 180 can have a hierarchical structure corresponding with the logical, and possibly physical, configuration of the device within an automation system along with the unique device ID and INFO data stored in the device from the factory.

The non-limiting address 180 has a first level identifier 182, second level identifier 184, third level identifier 186, fourth level identifier 188, and a fifth level identifier 190 that respectively distinguish the device from other actual, or potential, addresses of an automation system. The first level identifier 182 may correspond to a site location of the automated device while the second level identifier 184 corresponds with the network computing device that directs operation of the automated device within the assigned site. The third level identifier 186 may correspond with an object in which the automated device is interacting, such as a tank, pipe, mechanism, or tool. A particular device may be identified by the fourth level identifier 188 of the address and a device tag may be the fifth level identifier 190.

In some embodiments, an address module can input various address information from different sources. For instance, site, controller, and object information can be designated automatically from a host or server while device and tag information is designated from ID and INFO data sourced from the particular device. The host, or server, may be polled by the local computing circuitry during device deployment to verify the accuracy of the automatically generated network address identifiers for an automated device. That is, the address module may automatically generate address information for a device that is incorrect until a host, or server, provides correct address information during device deployment, which will alter the automatically generated address.

By automatically generating a network address and conducting minor address adjustments, as necessary, automated devices can efficiently be incorporated into sophisticated, and perhaps complex, automated systems, without degrading system capabilities or real-time performance. Returning to the timeline 160 of FIG. 4, the generation of a unique network address for an automated device allows for device-to-device direct communications in event 168. While such device-to-device communications can be used for a plethora of different purposes, various embodiments utilize the direct device communications to integrate the device into the automation system, establish the device's operation for a task, and/or optimize the function of the device with respect to other system automated devices.

The unique network address for an automated device may further be used for two-way communication with one or more network computing devices. Such two-way communications contrasts the conventionally one-way communication pathway from the network computing device instructing the respective automated devices when and how to operate. The two-way communication with the network computing device enables the automated device to provide feedback data, information, and signals to the network computing device, which can be utilized to understand the real-time operating conditions and performance of the automation system.

With all newly installed automated devices having unique network addresses that facilitates incorporation into the automation system, at least one automation task can be executed in event 168 with the newly installed automated devices from event 166. It is noted that portions of the timeline 160 may be conducted repeatedly as equipment, conditions, and tasks change over time. In a non-limiting example, the direct device-to-device communications without involvement of the network computing device of event 168 can be conducted repeatedly between one or more pair of automated devices in the alteration of the devices' respective automation instructions in response to a task being changed.

The automation and adaptation capabilities provided by one or more automated devices having local computing circuitry allows an automation system to be efficiently operated despite environmental, task, and device performance changes over time. The incorporation of local computing circuitry into an automated device ensures the compatibility of the device with an automation system due to the circuitry's ability to generate and utilize a network address to communicate to other devices in their native code, language, and protocol, regardless of the type of automation system, task, or network computing device being utilized.

Figure 6:
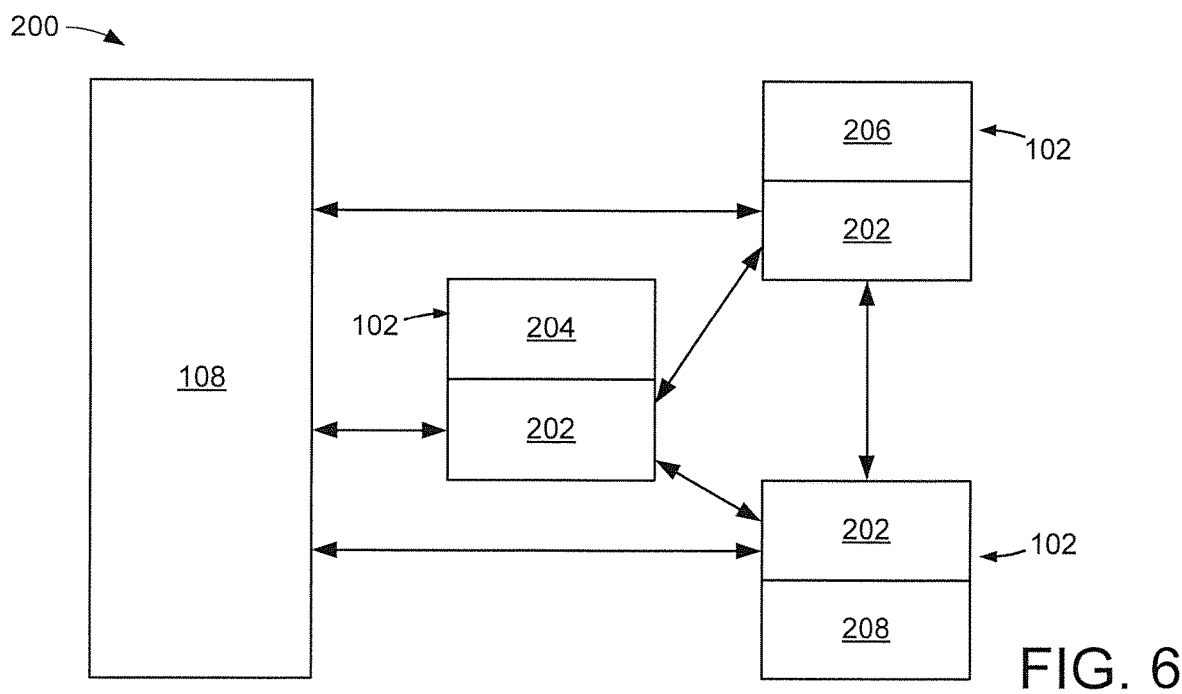
FIG. 6 depicts a block representation of portions of an example automation system configured and operated in accordance with assorted embodiments.

However, some automated device may not be manufactured with local computing circuitry and instead are "dummy" devices capable of only performing instructions inputted from a remote source, such as a network computing device. FIG. 6 depicts a block representation of portions of an example automation system 200 that employs physically isolated local computing circuitry 202 to optimize the execution of automation tasks. A physically isolated local computing circuitry can have one or more computing components positioned in a housing with means for connecting to an automated device. It is contemplated, but not required, that various computing components are mounted to a printed circuit board along with a physical port connector, such as a serial bus.

As shown, multiple separate local computing circuitry 202 are respectively connected to automated devices 102 that are configured to provide different automated capabilities and activity. For instance, a sensor 204 can detect one or more dynamic or static conditions while a valve 206 is positioned to influence the movement of material and a robotic assembly 208 articulates material to perform at least parts of a task. It is contemplated that a local computing circuitry 202 is physically connected in-line between the automated device 102 and the network computing device 108 via a wired connection, such as Ethernet, universal serial bus (USB), serial AT attachment (SATA). Other embodiments employ a wireless data pathway, such as with Bluetooth or secure local area network connections, between the local computing circuitry and the automated device and/or network computing device.

The connectivity and installation capabilities of a local computing circuitry 202 external to an automated device 102 allows for retrofit applications for automated devices that do not have local computing circuitry. It is contemplated that an external local computing circuitry 202 can be connected to an automated device that has internal local computing circuitry to provide redundant and/or supplemental device operation, programming, and communication capabilities. Through the use of an external circuitry 202, internal device computing circuitry, or a combination of the two, multiple concurrent, or sequential, data pathways can be established and maintained. Such data pathways can be employed to communicate redundant or different data to one or more destinations with different languages, code, and protocols, which allows automated devices to efficiently communicate in their native code, language, and protocol.

In some embodiments, an externally connected local computing circuitry 202 provides additional automation capabilities, such as optical, acoustic, or mechanical detectors, which can be utilized independently and collectively with the capabilities of the automated device 102. It is contemplated that the external local computing circuitry 202 may provide automation capabilities, such as material handling, processing, or translation, that are redundant or different than the connected automated device 102. The ability to provide redundant and/or additional sensing and automation capabilities allows for automation system upgrades simply by physically connecting the circuitry 202 in-line with the automation device 102.

Figure 7:
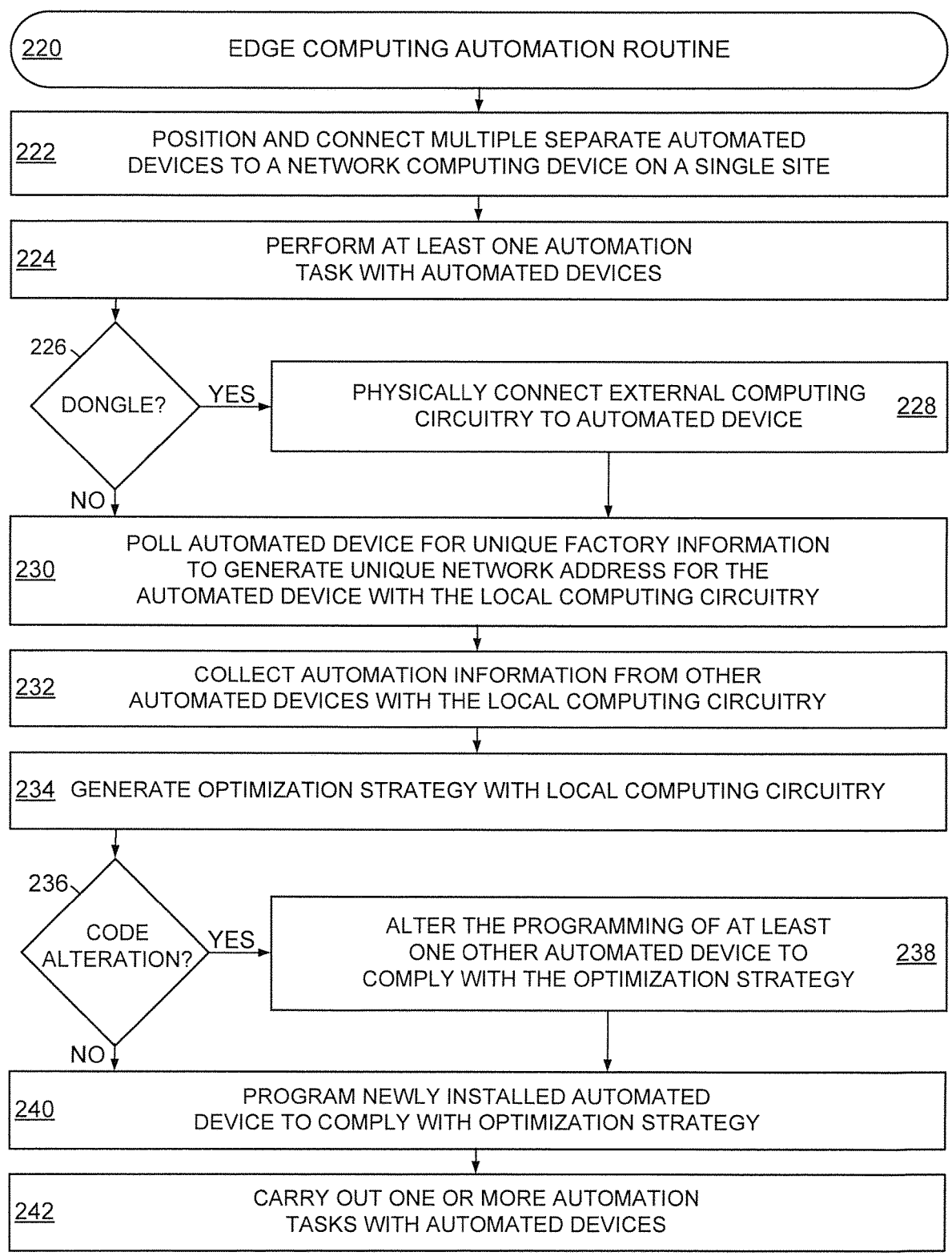
FIG. 7 is a flowchart of an example edge computing routine that can be executed by the various embodiments of FIGS. 1-6.

FIG. 7 is a flowchart of an edge computing automation routine 220 that can be carried out by the assorted embodiments of FIGS. 1-6. The routine 220 may begin with multiple automated devices being positioned on a site in step 222 and connected with a network computing device, such as a server, controller, or node. It is noted that step 222 may be skipped in the event a new automation site is being setup with routine 220. The various automated devices can be programmed from the factory with software, code, and protocols that facilitate at least one automated activity. Such programming may be augmented, replaced, or supplemented by commands and/or code provided by the connected network computing device as part of the automation system. For example, a sensor can be manufactured to optically detect at a first resolution and the connected network computing device alters the detection to a second resolution.

The automation activities executed by the assorted automated devices, as directed by the connected network computing device, can perform any number of tasks cyclically for any period of time before step 224 introduces at least one new automation device to the system. The automated device may or may not have internal computing circuitry. Hence, decision 226 evaluates if an external computing circuitry (dongle) is to be connected to the automated device. It is noted that an external computing circuitry may be chosen in decision 226 to complement internal computing circuitry of an automated device.

If an external computing circuitry is to be used, step 228 physically connects the external computing circuitry into the automation system. Such physical connection may be with data and or power cabling engaging one or more ports of the automation device and/or the on-site network computing device. Alternatively, the physical connection may involve placing the circuitry on-site and wirelessly connecting the circuitry to the automated device and/or the on-site network computing device.

The connection of the local computing circuitry in step 228, or in the event no external circuitry is utilized in decision 226, prompts step 230 to generate a unique network address for the new device with the local computing circuitry. The local computing circuitry may poll one or more unique factory parameters of the automated device, such as serial number, operating latency, or manufacture date, to generate the unique network address for the automated device. The polling of the device, in some embodiments, involves the local computing circuitry conducting one or more test operations or commands that convey unique hardware, software, and/or operational characteristics manufactured into the automated device, which corresponds to a truly unique address.

Once the unique network address is generated by the local computing circuitry, direct automated device to automated device and two-way network computing device communication can occur via one or more pathways. That is, the unique network address of an automated device can be employed to establish one or more data and/or signal pathways, which may be concurrent or sequentially employed to communicate between automated devices while bypassing the network computing device or back and forth between with the network computing device. The communication pathways are then employed in step 232 to collect information directly from other automated devices, which keeps the network computing device free to efficiently conduct high-level system operations, such as remote host access security or data transfers.

The collection of information in step 232 may involve the polling of any type and volume of data from other automated devices of the automation system. For instance, information pertaining to the automation activities, tasks, timing, programming, and collected data can be collected in step 232. With the direct automated device communication pathways, the native programming and communication protocol of the automated devices can be used regardless of the type, manufacturer, age, or function of the automated device, which contrasts the inefficiency of having to translate communication protocols and/or programming languages when communicating through the network computing device.

Collecting automated device information allows the local circuitry to generate an optimization strategy in step 234. The optimization strategy at least incorporates the capabilities of the newly installed automated device with the other automated devices of the system. As a non-limiting example, an optimization strategy can accomplish a previously conducted automation task by changing the timing, scope, type, or duration of one or more automation activities executed by the various automated devices of the system. As a result of utilizing the local computing circuitry of an automated device, the optimization strategy can increase the efficiency, safety, and productivity of the automation system by intelligently incorporating the newly installed automated device without degrading the efficiency of the network computing device.

The optimization strategy generated in step 234 may involve the reprogramming, repurposing, or otherwise altering the operation of one or more automated devices. Decision 236 determines if such an alteration is needed. If so, step 238 effectuates the optimization strategy with the local computing circuitry of at least one automated device by altering at least the programming code of at least one automated device. In the event no other automated device is to be altered to accomplish the optimization strategy, or at the conclusion of step 234, the local computing circuitry of an automated device programs the newly installed automated device in step 240 to be conducive to the automation tasks and the other automated devices of the system.

It is contemplated that the optimization strategy and programming of steps 238 and 240 may involve the enabling of device capabilities that were previously dormant or unavailable, such as sensing or automation activity provided by the connected local computing circuitry. The various alterations and capabilities of the respective automated devices can be conveyed to the network computing device at any time so that the network computing device can properly evaluate system performance and report accurate measurements and calculations to remote hosts.

With the newly installed automated device programmed in accordance with the optimization strategy, step 242 employs the programming of the respective automated devices of the automation system to carry out one or more automation tasks. By moving automated device incorporation and optimization to the edge of the automation system with local computing circuitry connected to an automated device, the network computing device is bypassed, which allows for more efficient channel, data storage, and processing utilization. Employing the local computing circuitry, instead of the network computing device, to evaluate real-time automated device operation further allows for efficient network computing device utilization while decreasing the computing requirements of the network computing device.

Figure 8:
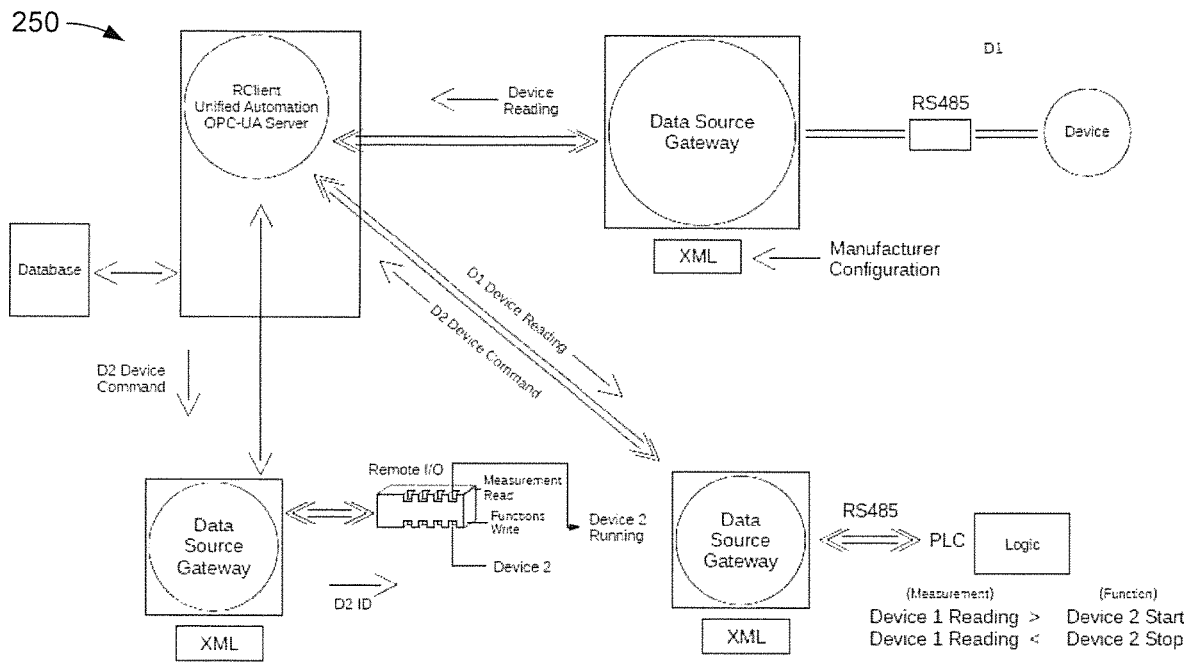
FIG. 8 depicts portions of an example edge computing automation system arranged in accordance with some embodiments.

FIG. 8 depicts portions of an example edge computing automation system 250 arranged in accordance with some embodiments. The system has a central OPC-UA Server that is connected to multiple different data source gateways and respectively employ via two-way communications. One or more databases can be employed by the Server to aid in the issuance of at least one device command that is relayed to an automation device, or remote data input/output (I/O) once receiving a device identification (ID) from the XML data of the local data source gateway.

One or more automation devices can be used to collect/detect conditions and operating parameters of the system 250. Such readings can be used to determine the operation of other automation devices. For instance, a measurement from a device, or I/O, can prompt a different automation device to activate or deactivate depending on the static configuration programmed into the system 250 by the logic. As shown, but in no way required or limiting, the remote I/O can handle multiple different device activities while a programmable logic controller (PLC) may alternatively be placed in-line between one or more automation devices and a data source gateway.

It is noted that the Server can communicate with the respective local data source gateways, but the gateways cannot communicate amongst themselves, independent of the Server. Hence, all collected measurements and readings must flow through the Server in order to prompt action by other automation devices, which can degrade performance when numerous gateways are connected and place an undue security risk with the integrity of the Server.

Figure 9:
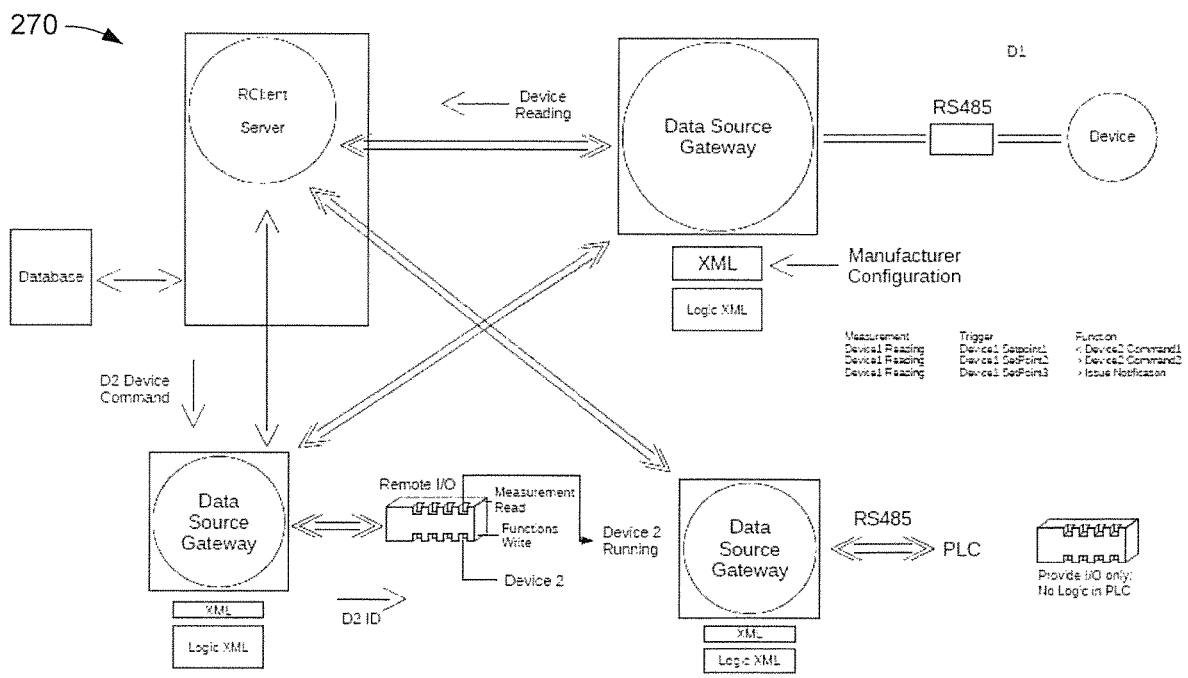
FIG. 9 depicts portions of an example edge computing automation system utilized in accordance with assorted embodiments.

The example edge computing automation system 270 of FIG. 9 illustrates how various embodiments can configure data source gateways with hardware that allows two-way communications independent of the Server. The ability for gateway-to-gateway two-way communications allows for more sophisticated automation of device activities as the channel, bandwidth, and processing of the Server is not the limiting factor, as it is in the system 250 of FIG. 8. For instance, the gateways, and Server, can utilize local gateway logic data (Logic XML) to respond to measured/detected conditions not with a static action (activate/deactivate), as with system 250, but instead with a trigger setpoint that provides a range of readings for a particular automation activity/function.

It is noted that utilizing the data source gateways for computing and automation activity, instead of the central Server, distributes the computing requirements of the system 270 and reduces performance bottlenecks associated with centralized Server management. The ability for gateways to communicate directly further allows for efficient introduction of new automation devices as the gateways, instead of the Server, can generate and utilize a new unique network address from a new automation device, which contrasts having to wait for the Server to identify, poll, and integrate a newly connected device into the system 270.

Through the assorted embodiments of an automation system employing a local computing circuitry connected to an automation device, the automation system can continuously operate in an optimized configuration due to the real-time monitoring of operating conditions and subsequent alteration of automated device programming. The ability to incorporate a new automated device or alter the programming of an existing automated device automatically with local computing circuitry without bringing the entire automation system offline while a user manually writes software, code, and/or commands provides long-term automation system viability and performance.

The local computing circuitry's ability to automatically gather system information and effectuate automated device code allows any type of device from any manufacturer that communicates with any protocol and executes any programming language to be automatically incorporated and optimized into an automation system without manual user involvement or processing with the network computing device. By configuring local computing circuitry as hardware that can be externally attached and connected to an automated device, legacy devices that otherwise would not have sophisticated capabilities can be upgraded and optimized simply by connecting the local computing circuitry.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising an automated device connected to at least one network computing device on a single site, the automated device comprising internal circuitry with no internal circuitry having computing capabilities, the internal circuitry connected to an external computing circuitry resident in a dongle physically attached to the automated device on the single site, the external computing circuitry configured to generate a unique automation network address from unique factory information collected from the automated device alone and independent of any connected network computing device and the internal circuitry.

2. The apparatus of claim 1, wherein the internal circuitry is incorporated in a housing of the automated device.

3. The apparatus of claim 1, wherein the external computing circuitry has a housing separate and independent of the automated device.

4. The apparatus of claim 3, wherein the external computing circuitry is physically connected to a port of the automated device.

5. The apparatus of claim 4, wherein the port is an Ethernet port.

6. The apparatus of claim 3, wherein the external computing circuitry is physically connected to the network computing device.

7. The apparatus of claim 3, wherein the external computing circuitry is wirelessly connected to the automated device.

8. The apparatus of claim 3, wherein the external computing circuitry is wirelessly connected to the network computing device.

9. The apparatus of claim 1, wherein the automated device is a valve and the network computing device is a programmable logic controller.

10. The apparatus of claim 1, wherein the automated device is an articulating assembly and the network computing device is a programmable logic controller.

11. A method comprising:
  connecting an external computing circuitry to an internal circuitry of a first automated device and at least one network computing device, the internal circuitry having no computing capabilities and resident in a dongle physically attached to the first automated device, the external computing circuitry, first automated device, and at least one network computing device each positioned on a single site;
  collecting at least one unique factory information from the first automated device with the local computing circuitry;
  generating a unique automation system network address from the at least one unique factory information with the external computing circuitry alone and independent of any connected network computing device and internal circuitry; and
  employing the unique automation system network address to conduct at least one automation task with the first automated device.

12. The method of claim 11, wherein the unique automation system network address is used for direct communication between two different automated devices without involvement of the network computing device or internal circuitry.

13. The method of claim 11, wherein the unique automation system network address is used for two-way communication between the first automated device and the network computing device.

14. The method of claim 11, wherein the at least one unique factory information is a serial number.

15. The method of claim 11, wherein the at least one unique factory information is an operational characteristic of the automated device.

16. The method of claim 15, wherein the operational characteristic is collected by executing a test sequence as directed by the external computing circuitry.

17. The method of claim 11, wherein the first automated device is altered by the external computing circuitry to comply with an optimization strategy generated by the external computing circuitry.

18. The method of claim 17, wherein the optimization strategy is generated after polling a second automated device to collect automation information.

19. The method of claim 18, wherein the second automated device is alerted by the external computing circuitry to comply with the optimization strategy.

20. The method of claim 11, wherein the unique automation system network address is generated and utilized for data communication automatically by the external computing circuitry without involving the network computing device or internal circuitry.

* * * * *